United States Patent
Lee et al.

(10) Patent No.: US 11,663,691 B2
(45) Date of Patent: May 30, 2023

(54) METHOD AND APPARATUS FOR RESTORING IMAGE

(71) Applicant: SAMSUNG ELECTRONICS CO., LTD., Suwon-si (KR)

(72) Inventors: Seho Lee, Seoul (KR); Yang Ho Cho, Seongnam-si (KR); Deokyoung Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 391 days.

(21) Appl. No.: 16/926,126

(22) Filed: Jul. 10, 2020

(65) Prior Publication Data

US 2021/0133920 A1   May 6, 2021

(30) Foreign Application Priority Data

Oct. 30, 2019   (KR) .................. 10-2019-0136237

(51) Int. Cl.
*G06T 3/00*        (2006.01)
*G06T 7/55*        (2017.01)
(Continued)

(52) U.S. Cl.
CPC .......... *G06T 3/0093* (2013.01); *G06T 3/0012* (2013.01); *G06T 3/4053* (2013.01); *G06T 5/20* (2013.01); *G06T 5/50* (2013.01); *G06T 7/55* (2017.01); *H04N 23/45* (2023.01); *H04N 23/951* (2023.01)

(58) Field of Classification Search
CPC ............... G06T 3/0093; G06T 3/0012; G06T 3/4053; G06T 5/20; G06T 5/50; G06T 7/55; G06T 2207/10052; G06T 2207/20081; G06T 2207/20084; G06T 5/006; G06T 7/593; G06T 2207/10028; G06T 5/001; G06T 7/557; H04N 5/2258; H04N 5/23232; G06N 3/0454
See application file for complete search history.

(56) References Cited

U.S. PATENT DOCUMENTS

| | | | |
|---|---|---|---|
| 7,009,652 | B1 | 3/2006 | Tanida |
| 7,412,107 | B2 | 8/2008 | Milanfar et al. |
| 7,724,439 | B2 | 5/2010 | Li et al. |
| 7,940,282 | B2 | 5/2011 | Milanfar et al. |

(Continued)

FOREIGN PATENT DOCUMENTS

| | | |
|---|---|---|
| CN | 105136315 A | 12/2015 |
| CN | 106296711 A | 1/2017 |

(Continued)

OTHER PUBLICATIONS

Peng et al., "Unsupervised Depth Estimation from Light Field Using a Convolutional Neural Network," 2018 International Conference on 3D Vision, IEEE, DOI: 10.1109/3DV.2018.00042, Sep. 5, 2018, pp. 295-303 (9 pages).

(Continued)

*Primary Examiner* — Hung H Lam
(74) *Attorney, Agent, or Firm* — Sughrue Mion, PLLC

(57) ABSTRACT

An image restoration apparatus generates a plurality of warped images by warping each of a plurality of input images based on respective depths corresponding to a plurality of disparities, and generates an output image with a high resolution based on the plurality of input images and the plurality of warped images using an image restoration model.

27 Claims, 12 Drawing Sheets

(51) Int. Cl.
  *G06T 3/40* (2006.01)
  *G06T 5/20* (2006.01)
  *G06T 5/50* (2006.01)
  *H04N 23/45* (2023.01)
  *H04N 23/951* (2023.01)
  *H04N 5/20* (2006.01)

(56) References Cited

U.S. PATENT DOCUMENTS

| | | | |
|---|---|---|---|
| 8,237,841 | B2 | 8/2012 | Tanida et al. |
| 9,485,397 | B2 | 11/2016 | Rudmann et al. |
| 2001/0005204 | A1* | 6/2001 | Matsumoto ............. G06T 15/10 345/418 |
| 2006/0000263 | A1 | 1/2006 | Su et al. |
| 2006/0031917 | A1* | 2/2006 | Winder ................ H04N 19/597 375/E7.199 |
| 2017/0078568 | A1 | 3/2017 | Venkataraman et al. |
| 2017/0111558 | A1 | 4/2017 | Brueckner et al. |
| 2017/0269340 | A1 | 9/2017 | Shmunk |
| 2018/0152692 | A1 | 5/2018 | Cho et al. |
| 2018/0376084 | A1 | 12/2018 | Ulaganathan et al. |
| 2019/0035113 | A1* | 1/2019 | Salvi ....................... G06T 9/002 |
| 2019/0087690 | A1 | 3/2019 | Srivastava |
| 2020/0051206 | A1* | 2/2020 | Munkberg ................ G06T 1/20 |

FOREIGN PATENT DOCUMENTS

| | | |
|---|---|---|
| CN | 106331439 A | 1/2017 |
| JP | 2018-125701 A | 8/2018 |
| JP | 2018-136211 A | 8/2018 |
| KR | 10-2007-0122347 A | 12/2007 |
| KR | 10-2019-0053074 A | 5/2019 |

OTHER PUBLICATIONS

Zhou et al., "Multiple view image denoising using 3D focus image stacks," Computer Vision and Image Understanding vol. 171 (2018) 34-47, Elsevier, Jun. 2, 2018, ISSN: 1077-3142, pp. 14.

Cheng et al., "Light Field Super-Resolution By Jointly Exploiting Internal and External Similarities," IEEE Transactions on Circuits and Systems for Video Technology, vol. 30, No. 8, Jun. 6, 2019, ISSN: 1051-8215, pp. 2604-2616 (pp. 13).

Communication dated Feb. 17, 2021 issued by the European Patent Office in European Application No. 20194220.8.

M. Shahzeb Khan Gul et al. "Spatial and Angular Resolution Enhancement of Light Fields Using Convolutional Neural Networks" retrieved from arXiv:1707.00815v2 [cs.CV], Feb. 13, 2018, (14 pages total).

* cited by examiner

METHOD AND APPARATUS FOR RESTORING IMAGE

CROSS-REFERENCE TO RELATED APPLICATION

This application claims priority from Korean Patent Application No. 10-2019-0136237, filed on Oct. 30, 2019, in the Korean Intellectual Property Office, the disclosure of which is incorporated herein by reference in its entirety.

BACKGROUND

1. Field

One or more example embodiments relate to technology for restoring an image, and more particularly to, methods and apparatuses for restoring an image based on a plurality of input images captured by an image sensor including a multi-lens array or captured by a plurality of image sensors.

2. Description of Related Art

Due to development of optical technologies and image processing technologies, capturing apparatuses are being utilized in a wide range of fields, for example, multimedia content, security and recognition. For example, a capturing apparatus may be mounted in a mobile device, a camera, a vehicle or a computer, to capture an image, to detect an object or to acquire data to control a device. A volume of a capturing apparatus may be determined based on, for example, a size of a lens, a focal length of a lens or a size of a sensor. To reduce the volume of the capturing apparatus, a multi-lens including small lenses may be used.

SUMMARY

One or more example embodiments may address at least the above problems and/or disadvantages and other disadvantages not described above. Also, the example embodiments are not required to overcome the disadvantages described above, and an example embodiment may not overcome any of the problems described above.

One or more example embodiments provide an image restoration method and an image restoration apparatus.

In accordance with an aspect of an example embodiment, there is provided an image restoration method including: acquiring a plurality of pieces of input image information; generating, with respect to each of a plurality of disparities, a plurality of pieces of warped image information based on the plurality of pieces of input image information; and generating an output image based on the plurality of pieces of input image information and the plurality of pieces of warped image information, by using an image restoration model.

The plurality of pieces of input image information may include a plurality of input images captured by using lenses located in different positions.

The generating the plurality of pieces of warped image information may include generating, with respect to each of the plurality of disparities, a plurality of warped images, as the plurality of pieces of warped image information, by warping each of the plurality of input images to a pixel coordinate system corresponding to a target image based on a depth corresponding to each of the plurality of disparities.

The generating the plurality of warped images may include generating a warped image by warping all of pixels in a first input image, among the plurality of input images, to the pixel coordinate system corresponding to the target image based on a single depth corresponding to a first disparity, among the plurality of disparities.

A disparity may be set for an input image with respect to the target image, and the depth corresponding to the disparity may be based on the disparity and a gap between sensing units that capture the target image and the input image.

The generating the output image may include generating the output image by providing, as an input to the image restoration model, data obtained by concatenating the plurality of input images and the plurality of warped images corresponding to each of the plurality of disparities.

The plurality of pieces of input image information may include a plurality of input feature maps extracted from a plurality of input images by using a feature extraction model.

The generating the plurality of pieces of warped image information may include generating, with respect to each of the plurality of disparities, a plurality of warped feature maps, as the plurality of pieces of warped image information, by warping each of the plurality of input feature maps to a pixel coordinate system corresponding to a target image based on a depth corresponding to each of the plurality of disparities.

The generating the output image may include generating the output image by providing, as an input to the image restoration model, data obtained by concatenating the plurality of input feature maps and the plurality of warped feature maps corresponding to each of the plurality of disparities.

The image restoration model may be based on a neural network, the neural network including at least one convolution layer configured to apply a convolution filtering to input data.

The plurality of disparities may be less than or equal to a maximum disparity and greater than or equal to a minimum disparity, and the maximum disparity may be based on a minimum capturing distance of sensing units, the sensing units configured to capture input images corresponding to the plurality of pieces of input image information, a gap between the sensing units, and focal lengths of the sensing units.

The plurality of disparities may be a finite number of disparities.

The generating the output image may include generating the output image without sensing a depth to a target point corresponding to an individual pixel of an input image.

The generating the plurality of pieces of warped image information may include generating a piece of warped image information by applying a coordinate mapping function to an input image corresponding to a piece of input image information, the coordinate mapping function being determined in advance with respect to a target sensing unit configured to capture a target image and a sensing unit configured to capture the input image.

A resolution of the output image may be higher than a resolution of each of the plurality of pieces of input image information.

The plurality of pieces of input image information may include a multi-lens image captured by an image sensor including a multi-lens array, the multi-lens image including a plurality of input images.

The plurality of pieces of input image information may include a plurality of input images respectively captured by a plurality of image sensors.

In accordance with an aspect of an example embodiment, there is provided a non-transitory computer-readable storage medium storing instructions that, when executed by at least one processor, cause the at least one processor to perform the above method.

In accordance with an aspect of an example embodiment, there is provided an image restoration apparatus including: an image sensor configured to acquire a plurality of pieces of input image information; and a processor configured to: generate, with respect to each of a plurality of disparities, a plurality of pieces of warped image information based on each of the plurality of pieces of input image information, and generate an output image based on the plurality of pieces of input image information and the plurality of pieces of warped image information, by using an image restoration model.

In accordance with an aspect of an example embodiment, there is provided an image restoration apparatus including: a lens array including a plurality of lenses; a sensing array including a plurality of sensing elements configured to sense light passing through the lens array, the sensing array including a plurality of sensing regions respectively corresponding to the plurality of lenses and configured to acquire a plurality of pieces of input information; and a processor configured to: generate, with respect to each of a plurality of disparities, a plurality of pieces of warped information based on each of the plurality of pieces of input information, and generate an output image based on the plurality of pieces of input information and the plurality of pieces of warped information, by using an image restoration model.

A resolution of the output image may be higher than a resolution corresponding to each of the plurality of pieces of input information.

The processor may be further configured to generate, with respect to each of the plurality of disparities, the plurality of pieces of warped information by warping each of the plurality of pieces of input information to a pixel coordinate system corresponding to a target image based on a depth corresponding to each of the plurality of disparities.

The processor may be further configured to generate a piece of warped information by warping all of pixels corresponding to a piece of input information, among the plurality of pieces of input information, to the pixel coordinate system corresponding to the target image based on a single depth corresponding to a first disparity among the plurality of disparities.

The processor may be further configured to generate the output image by providing, as an input to the image restoration model, data obtained by concatenating the plurality of pieces of input information and the plurality of pieces of warped information corresponding to each of the plurality of disparities.

The processor may be further configured to extract, as the plurality of pieces of input information, a plurality of input feature maps from a plurality of input images, by using a feature extraction model.

The processor may be further configured to generate, with respect to each of the plurality of disparities, a plurality of warped feature maps, as the plurality of pieces of warped information, by warping each of the plurality of input feature maps to a pixel coordinate system corresponding to a target image based on a depth corresponding to each of the plurality of disparities.

The processor may be further configured to generate the output image by providing, as an input to the image restoration model, data obtained by concatenating the plurality of input feature maps and the plurality of warped feature maps corresponding to each of the plurality of disparities.

BRIEF DESCRIPTION OF THE DRAWINGS

The above and/or other aspects will be more apparent by describing certain example embodiments with reference to the accompanying drawings, in which.

DETAILED DESCRIPTION

Figure 1:
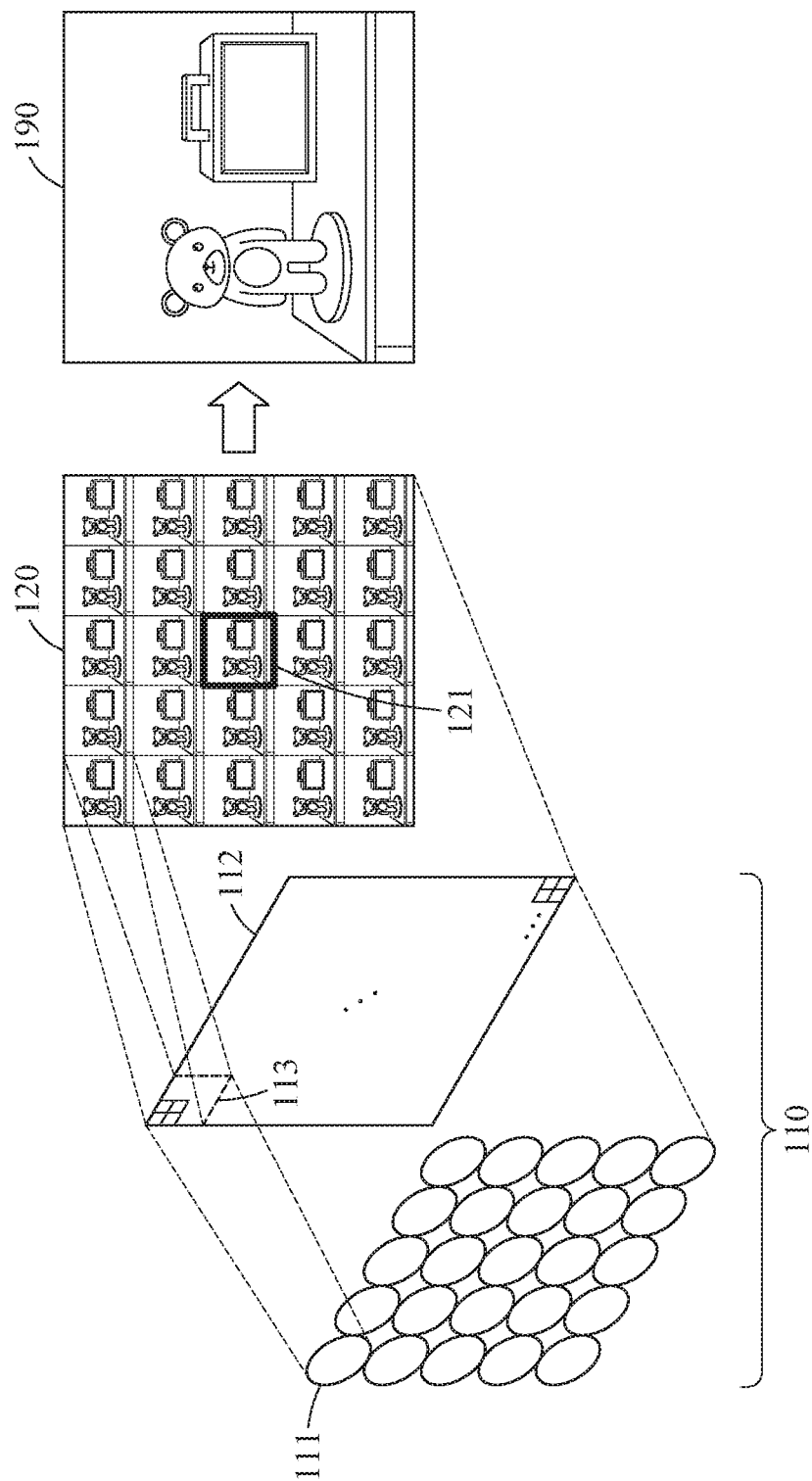
FIG. 1 illustrates a process of an image restoration according to an example embodiment.

Example embodiments will be described in detail with reference in the accompanying drawings, wherein like reference numerals refer to the like elements throughout.

The following structural or functional descriptions are examples to merely describe the example embodiments, and the scope of the example embodiments are not limited to the descriptions provided in the present specification. Various changes and modifications can be made thereto by those of ordinary skill in the art.

It should be further understood that the terms "comprises," "includes," and "comprising,", and/or "including" when used in this specification, specify the presence of stated features, integers, steps, operations, elements, components or a combination thereof, but do not preclude the presence or addition of one or more other features, integers, steps, operations, elements, components, and/or groups thereof. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Unless otherwise defined herein, all terms used herein including technical or scientific terms have the same meanings as those generally understood by one of ordinary skill in the art. Terms defined in dictionaries generally used should be construed to have meanings matching with contextual meanings in the related art and are not to be construed as an ideal or excessively formal meaning unless otherwise defined herein.

Regarding the reference numerals assigned to the elements in the drawings, it should be noted that the same elements will be designated by the same reference numerals, wherever possible, even if they are shown in different drawings.

FIG. 1 illustrates a process of an image restoration according to an example embodiment.

A quality of an image captured and restored by an image sensor 110 may be determined based on a number of sensing elements included in a sensing array 112 and an amount of light incident on a sensing element. For example, a resolution of an image may be determined by the number of sensing elements included in the sensing array 112, and a sensitivity of an image may be determined by the amount of light incident on the sensing element. An amount of light incident on a sensing element may be determined based on a size of the sensing element. When the size of the sensing element increases, the amount of light incident on the sensing element and a dynamic range of the sensing array 112 may increase. Thus, a resolution of an image captured by the image sensor 110 may increase as the number of sensing elements included in the sensing array 112 increases. Also, the image sensor 110 may advantageously operate to capture an image with a high sensitivity even at a low illuminance as a size of a sensing element increases.

A volume of the image sensor 110 may be determined based on a focal length of a lens element 111. For example, the volume of the image sensor 110 may be determined based on a gap between the lens element 111 and the sensing array 112. To collect light refracted by the lens element 111, the lens element 111 and the sensing array 112 may need to be spaced apart from each other by the focal length of the lens element 111.

The focal length of the lens element 111 may be determined based on a field of view (FOV) of the image sensor 110 and a size of the lens element 111. For example, when the FOV is fixed, the focal length may increase in proportion to the size of the lens element 111. Also, to capture an image within a predetermined FOV, the size of the lens element 111 may need to increase as a size of the sensing array 112 increases.

As described above, to increase a sensitivity of an image while maintaining a FOV and a resolution of the image, the volume of the image sensor 110 may be increased. For example, to increase a sensitivity of an image while maintaining a resolution of the image, a size of each of sensing elements included in the sensing array 112 may need to increase while maintaining the number of sensing elements. Thus, the size of the sensing array 112 may increase. In this example, to maintain the FOV, the size of the lens element 111 may increase as the size of the sensing array 112 increases, and the focal length of the lens element 111 may increase. Thus, the volume of the image sensor 110 may increase.

Referring to FIG. 1, the image sensor 110 includes a lens array and the sensing array 112. The lens array includes lens elements 111, and the sensing array 112 includes sensing elements. The lens elements 111 may be arranged on a plane of the lens array, and the sensing elements may be arranged on a plane of the sensing array 112. The sensing elements of the sensing array 112 may be classified based on sensing regions 113 respectively corresponding to the lens elements 111. The plane of the lens array may be parallel to the plane of the sensing array 112, and may be spaced apart from the plane of the sensing array 112 by the focal length of the lens element 111 included in the lens array. The lens array may be referred to as a "micro multi-lens array (MMLA)" or a "multi-lens array".

For example, when a size of each of the lens elements 111 included in the lens array decreases, that is, when a number of lenses included in the same area on the lens array increases, the focal length of the lens element 111 and a thickness of the image sensor 110 may decrease. Tus, a thin camera may be implemented. In this example, the image sensor 110 may restore a high resolution output image 190 by rearranging and combining low resolution input images 120 captured by each lens element 111.

An individual lens element 111 in the lens array may cover a sensing region 113 of the sensing array 112 corresponding to a lens size of the lens element 111. The sensing region 113 covered by the lens element 111 in the sensing array 112 may be determined based on the lens size of the lens element 111. The sensing region 113 may refer to a region on the sensing array 112 that is reached by rays within a predetermined FOV by passing through the lens element 111. A size of the sensing region 113 may be represented as a distance from a center point of the sensing region 113 to an outermost point of the sensing region 113, or a diagonal length, and the lens size of the lens element 111 may correspond to a diameter of a lens of the lens element 111.

Each of sensing elements in the sensing array 112 may generate sensing information based on rays passing through lenses of the lens array. For example, a sensing element may sense an intensity value of light received by the lens element 111. The image sensor 110 may determine intensity information corresponding to an original signal associated with points included in a FOV of the image sensor 110, based on sensing information output by the sensing array 112, and may restore a captured image based on the determined intensity information. For example, the sensing array 112 may be an image sensing module including a charge-coupled device (CCD) or a complementary metal-oxide-semiconductor (CMOS).

Also, a sensing element may include a color filter to sense a desired color and may generate, as sensing information, a color intensity value corresponding to a predetermined color. Each of a plurality of sensing elements included in the sensing array 112 may sense a color different from that of a neighboring sensing element that is spatially adjacent to each of the sensing elements.

When a diversity of sensing information is sufficiently secured and when a full rank relationship between the sensing information and original signal information corresponding to the points in the FOV of the image sensor 110 is formed, a captured image corresponding to a maximum resolution of the sensing array 112 may be obtained. The diversity of sensing information may be secured based on parameters of the image sensor 110, for example, a number of lenses included in the lens array and a number of sensing elements included in the sensing array 112.

For example, the sensing region 113 covered by the individual lens element 111 may include a non-integer number of sensing elements. In an example, a multi-lens array structure may be implemented as a fractional alignment structure. For example, when lens elements 111 included in the lens array have the same lens size, a number of lens elements 111 included in the lens array and a number of sensing elements included in the sensing array 112 may be relatively prime. A ratio P/L between a number P of sensing elements corresponding to one axis of the sensing array 112 and a number L of lens elements corresponding to one axis of the lens array may be determined as a real number. Each of the lens elements may cover a P/L number of sensing elements, which is the same number as a pixel offset.

Based on the above-described fractional alignment structure, in the image sensor 110, an optical center axis (OCA) of each lens element 111 may be slightly different from that of the sensing array 112. For example, the lens element 111 may be arranged eccentrically with respect to a sensing element. Thus, lens elements 111 of the lens array may receive different pieces of light field (LF) information. An LF may be emitted from an arbitrary target point, and may refer to a field that indicates intensities and directions of rays reflected from an arbitrary point toward a subject. LF information may refer to information about a combination of a plurality of LFs. Since a direction of a chief ray of each lens element 111 is also changed, sensing regions 113 may receive different pieces of LF information. Thus, a plurality of pieces of input information (for example, input image information) that are slightly different from each other may be acquired from a plurality of sensing regions. The image sensor 110 may optically acquire a larger amount of sensing information based on the plurality of pieces of input information.

The above-described image sensor 110 may be classified into a plurality of sensing units. Each of the plurality of sensing units may be distinguished by a unit of a lens included in a multi-lens array. For example, each sensing unit may include a lens, and sensing elements of a sensing region 113 covered by the lens. In an example, the image sensor 110 may generate an individual input image from sensing information acquired for each sensing region 113 corresponding to each lens. For example, each of the plurality of sensing units may individually acquire an input image. As described above, since the plurality of sensing units acquire different pieces of LF information, an input image captured by each of the sensing units may represent a slightly different scene. For example, the image sensor 110 may include "N" lenses and may be classified into "N" sensing units. Since the "N" sensing units individually capture input images, the image sensor 110 may acquire "N" input images 120. In this example, "N" may be an integer greater than or equal to "2". In FIG. 1, a multi-lens array may include "25" lenses (N=5×5=25), and the image sensor 110 may capture "25" low resolution input images 120. In another example, a multi-lens image may include "36" input images (N=6×6=36). Although a plurality of sensing units are included in a single image sensor 110 as described above, the sensing units are not limited thereto. For example, a sensing unit may be an independent image sensing module (for example, a camera sensor). In this example, each sensing unit may be located in a position different from that of another sensing unit.

In the following description, the image sensor 110 may generate a plurality of low resolution input images 120 from a variety of sensing information acquired as described above, and may restore the high resolution output image 190 based on a target image 121 among the plurality of low resolution input images 120. Although a central image among the plurality of input images 120 is determined as the target image 121 in an example embodiment of FIG. 1, the target image 121 is not limited thereto. For example, another input image may also be used as the target image 121. Also, the image sensor 110 may use an image of a separate additional image sensor as a target image. The additional image sensor may be, for example, a camera sensor capable of capturing an image with a relatively high resolution in comparison to the image sensor 110.

Figure 2:
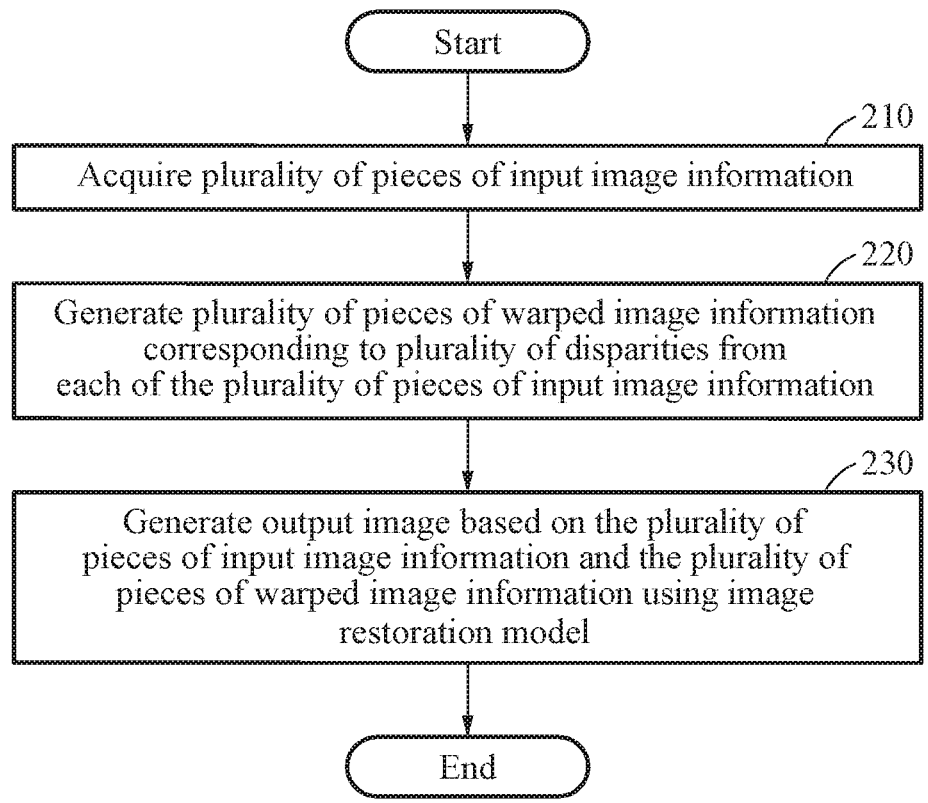
FIG. 2 is a flowchart illustrating an image restoration method according to an example embodiment.
Figure 3:
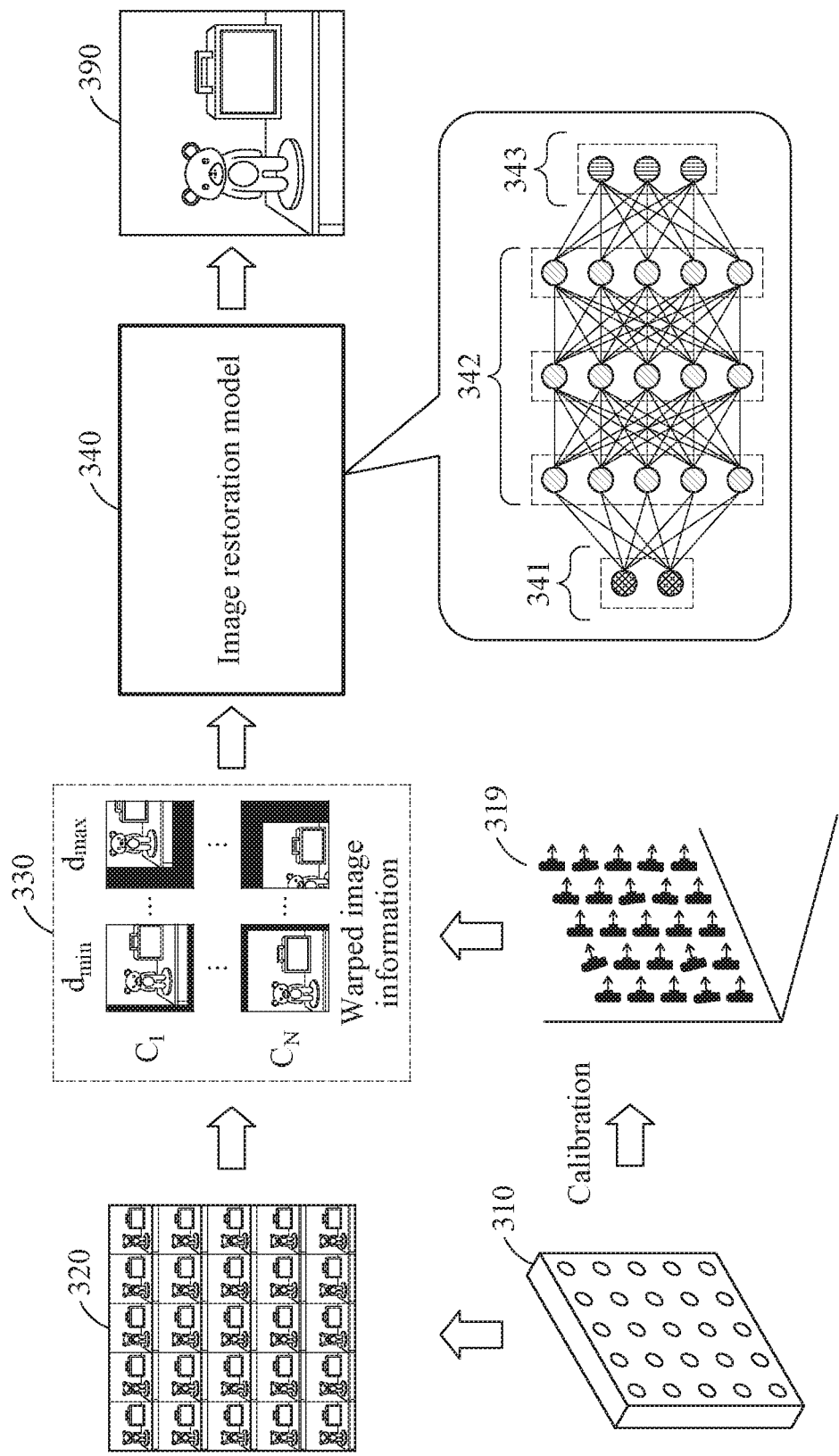
FIG. 3 is a diagram illustrating an image restoration using an image restoration model according to an example embodiment.

FIG. 2 is a flowchart illustrating an image restoration method according to an example embodiment. FIG. 3 is a diagram illustrating an image restoration using an image restoration model according to an example embodiment.

Referring to FIG. 2, in operation 210, an image restoration apparatus may acquire a plurality of pieces of input image information. Input image information may be, but is not limited to, an input image itself, and may include, for example, an input feature map extracted from an input image using a feature extraction model. An example in which the input image information is an input image will be described below with reference to FIGS. 4 through 8, and an example in which the input image information is an input feature map will be described below with reference to FIGS. 9 and 10.

The image restoration apparatus may capture a plurality of input images using an image sensor 310 of FIG. 3. For example, in the image restoration apparatus, the image sensor 310 including a multi-lens array may capture a multi-lens image 320 including a plurality of input images. In the multi-lens image 320, each of the input images may be captured by an individual sensing unit included in the image sensor 310. A first input image through an N-th input image may be individually captured by a first sensing unit $C_1$ through an N-th sensing unit $C_N$, respectively. In another example, each of a plurality of image sensors 310 in the image restoration apparatus may capture an input image. In this example, each of sensing units may be an independent image sensor 310.

In operation 220, the image restoration apparatus may generate a plurality of pieces of warped information (for example, warped image information 330) corresponding to a plurality of disparities from each of a plurality of pieces of input information (for example, input image information). A disparity may refer to a difference in position of the same target point between two images, and may be, for example, a difference between pixel coordinates. In an example, a disparity of a target image with respect to each input image may be set to an arbitrary value, and a virtual distance from the image sensor 310 to a target point may be determined based on the set disparity. The image restoration apparatus may generate the warped image information 330 based on a distance determined based on the set disparity. The warped image information 330 may be, but is not limited to, a warped image obtained by converting an input image to a pixel coordinate system of the target image, and may also be a warped feature map obtained by converting an input feature map extracted from an input image to a pixel coordinate system of a target sensing unit that captures the target image. A virtual depth determined based on the above-described disparity, and warping based on the virtual depth will be described below with reference to FIG. 4. In an example embodiment, a depth value may refer to a distance to a target point.

For example, as shown in FIG. 3, the image restoration apparatus may generate warped image information 330 corresponding to a minimum disparity $d_{min}$ and warped image information 330 corresponding to a maximum disparity $d_{max}$ for each of the input images included in the multi-lens image 320, based on camera calibration parameters 319. When the minimum disparity $d_{min}$ equals to 0, a warped image may be an input image itself. The camera calibration parameters 319 will be described below with reference to FIG. 7. In an example, when a number of disparities is "D", the image restoration apparatus may generate "D" pieces of warped image information 330 for each of "N" input images, and accordingly "N×D" pieces of warped image information 330 in total may be generated. In this example, "D" may be an integer greater than or equal to "1".

In operation 230, the image restoration apparatus may generate an output image 390 based on the plurality of pieces of input image information and a plurality of pieces of warped image information 330, using an image restoration model 340. The image restoration model 340 may be a model trained to output the output image 390 in response to an input of input image information. The image restoration model 340 may have, for example, a machine learning structure, and may be a neural network. The neural network may be used to restore an image based on an image registration by mapping input data and output data that are in a nonlinear relationship based on deep learning. The deep learning may be a machine learning technique to solve an image registration problem by using a big data set. Through supervised or unsupervised learning of the deep learning, input data and output data may be mapped to each other. The image restoration model 340 may include an input layer 341, a plurality of hidden layers 342, and an output layer 343. Data input through the input layer 341 may be propagated through the plurality of hidden layers 342 and may be output through the output layer 343. However, data may be directly input to the hidden layers 342, instead of the input layer 341 and the output layer 343, or may be directly output from the hidden layers 342. The neural network may be trained by, for example, a backpropagation.

The above-described image restoration model 340 may be implemented as a convolutional neural network (CNN). The CNN may refer to a neural network including a convolution layer, and a hidden layer of the CNN may include a convolution layer. For example, the CNN may include a convolution layer with nodes that are connected through a kernel. The CNN may be a network that is trained in advance based on training data to output an output image with a high resolution in response to an input of a plurality of pieces of input image information and a plurality of pieces of warped image information. The output image may be, for example, an image in which pixels that are included in input images and warped images and that are matched to a target image are registered, and a resolution of the output image may be higher than a resolution corresponding to a plurality of pieces of input information (for example, an input image). The image restoration apparatus may extract feature data by performing a convolution filtering on data input to the convolution layer. The feature data may refer to data obtained by abstracting a feature of an image, and may include, for example, a result value of a convolution operation based on a kernel of a convolution layer. The image restoration apparatus may perform a convolution operation with respect to a pixel at an arbitrary position and neighboring pixels in an image, based on element values of a kernel. The image restoration apparatus may calculate a convolution operation value for each of the pixels of the image by sweeping the kernel with respect to the pixels. An example in which the image restoration model 340 is implemented as a CNN will be further described below with reference to FIG. 8.

For example, the image restoration apparatus may provide "N" pieces of input image information acquired in operation 210 and "N×D" pieces of warped image information 330 generated in operation 220 to the image restoration model 340. As described above, the image restoration model 340 may include a convolution layer that applies a convolution filtering to input data. Thus, the image restoration apparatus may apply the convolution filtering to the "N" pieces of input image information and the "N×D" pieces of warped image information 330 using the image restoration model 340, to generate the output image 390 with a high resolution.

Figure 4:
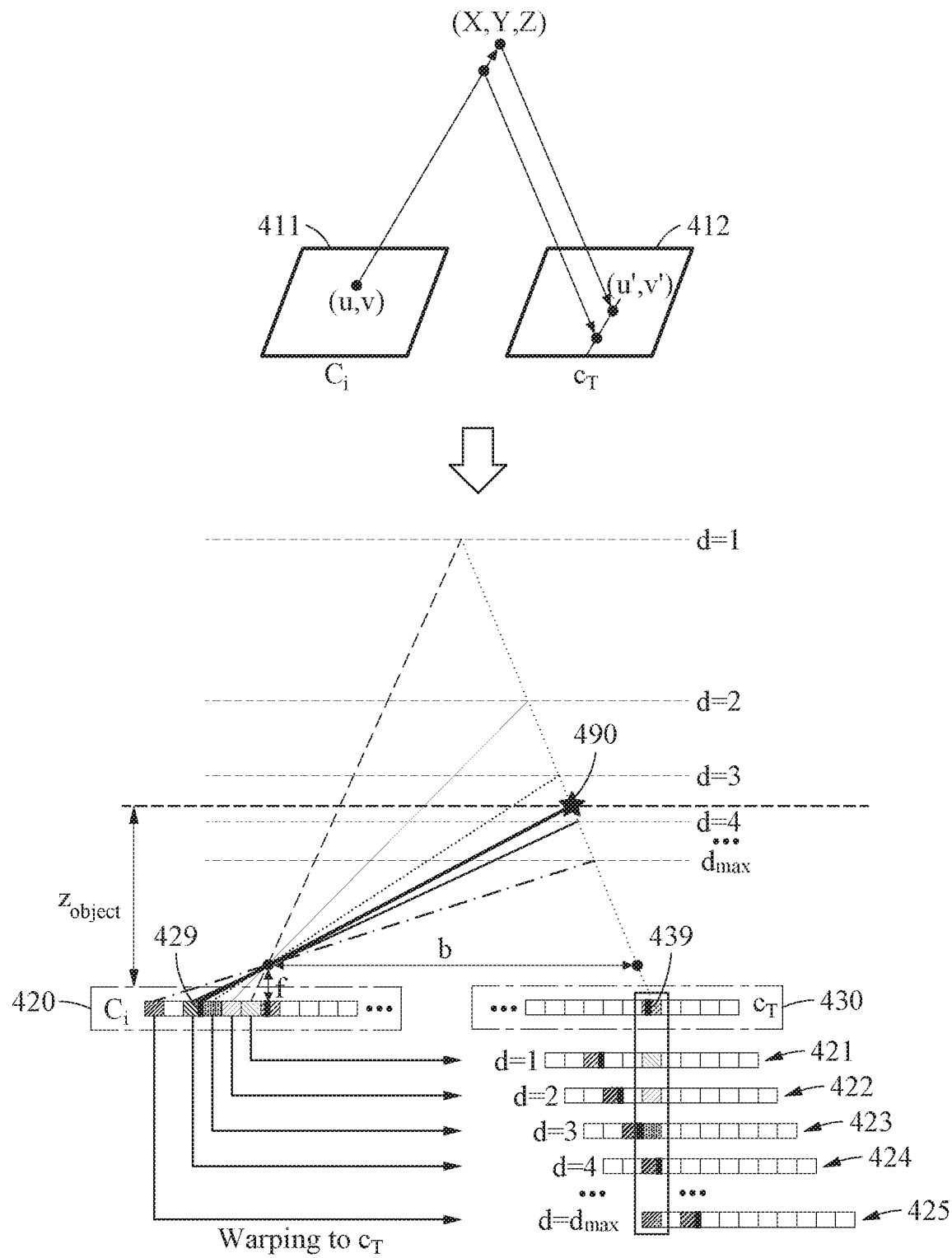
FIG. 4 illustrates a generation of a warped image to be input to an image restoration model according to an example embodiment.

FIG. 4 illustrates a generation of a warped image to be input to an image restoration model according to an example embodiment.

An image restoration apparatus may generate a plurality of pieces of warped information (for example, a warped image) by warping each of a plurality of pieces of input information (for example, input images) to a pixel coordinate system corresponding to a target image 430 based on a depth corresponding to each of a plurality of disparities. For example, FIG. 4 illustrates a warped image obtained by warping an i-th input image 420 among "N" input images to a pixel coordinate system corresponding to the target image 430.

In the following description, a world coordinate system may refer to a coordinate system based on an arbitrary point on the world as a three-dimensional (3D) coordinate system. A camera coordinate system may refer to a 3D coordinate system based on a camera, and a principal point of a sensing unit may be used as an original point, an optical axis direction of the sensing unit may be used as a z-axis, a vertical direction of the sensing unit may be used as a y-axis, and a horizontal direction of the sensing unit may be used as an x-axis. The pixel coordinate system may also be referred to as an "image coordinate system", and may represent two-dimensional (2D) coordinates of a pixel in an image.

For example, world coordinates of a target point 490 spaced apart from an image sensor may be assumed to be (X, Y, Z). Pixel coordinates sensed by an i-th sensing unit 411 $C_i$ among "N" sensing units may be assumed to be (u, v). Pixel coordinates sensed by a target sensing unit 412 $C_T$ may be assumed to be (u', v'). However, it may be difficult to accurately determine a distance to the target point 490 based on only a pixel value sensed by each sensing unit. The image restoration apparatus may assume that an input image has an arbitrary disparity with respect to the target image 430, and may warp the input image to the pixel coordinate system corresponding to the target image 430 based on a distance value corresponding to the disparity.

The image restoration apparatus may calculate normalized coordinates ($x_{c_i}$, $y_{c_i}$) of the i-th input image 420 by normalizing pixel coordinates ($u_{c_i}$, $v_{c_i}$) of an individual pixel of the i-th input image 420 as shown in Equation 1 below.

$$x_{c_i} = (u_{c_i} - c_x^{(i)})/f_x^{(i)}$$

$$y_{c_i} = (v_{c_i} - c_y^{(i)})/f_y^{(i)}. \quad \text{[Equation 1]}$$

In Equation 1, $c_x^{(i)}$, $c_y^{(i)}$ denote coordinates of principal points of the i-th sensing unit 411 $C_i$ with respect to an x-axis and a y-axis of the i-th sensing unit 411 $C_i$, respectively, and $f_x^{(i)}$, $f_y^{(i)}$ denote focal lengths in the x-axis and the y-axis of the i-th sensing unit 411 $C_i$, respectively. The image restoration apparatus may normalize an individual pixel of the i-th input image 420 by using the principle point of the i-th sensing unit 411 $C_i$, as an original point, that is, by dividing a difference between pixel coordinates of an individual pixel value and the principal point of the i-th sensing unit 411 $C_i$ by a focal length as shown in Equation 1.

Also, the image restoration apparatus may calculate 3D camera coordinates ($X_{c_i}$, $Y_{c_i}$, $Z_{c_i}$) of the i-th sensing unit 411 $C_i$ based on a depth $Z_{c_i}$ corresponding to the normalized coordinates ($x_{c_i}$, $y_{c_i}$) as shown in Equation 2 below.

$$X_{c_i} = x_{c_i} \cdot z_{c_i}$$

$Y_{c_i} = y_{c_i} z_{c_i}$ $Z_{c_i} = z_{c_i}$ [Equation 2]

As shown in Equation 2 above, the image restoration apparatus may acquire $X_{c_i}$, $Y_{c_i}$ by multiplying the depth $Z_{c_i}$ by each of the normalized coordinates ($x_{c_i}$, $y_{c_i}$). The image restoration apparatus may set a depth value $Z_{c_i}$ of 3D camera coordinates to the depth $Z_{c_i}$. Thus, the image restoration apparatus may calculate 3D camera coordinates based on an optical axis of the i-th sensing unit 411 $C_i$ that captures a corresponding input image based on a depth corresponding to each pixel.

As described above, it may be difficult to accurately estimate a depth value to the target point 490 indicated by a pixel of the input image based on only a pixel value of the pixel, and thus the image restoration apparatus may perform a coordinate transformation based on Equation 2 using a depth value corresponding to a portion of disparities within a finite range. The range of disparities may be limited to [$d_{min}$, $d_{max}$], and a depth value may also be limited to [$Z_{min}$, ∞). Also, $Z_{min}$ denotes a minimum capturing distance of an image sensor and may be, for example, 10 centimeters (cm).

For example, in FIG. 4, the image restoration apparatus may assume that the i-th input image 420 has a disparity d of "1" with respect to the target image 430 and may use a depth value (for example, $z_1$) corresponding to the disparity d of "1". In Equation 2, $z_1$ may be used as the depth $Z_{c_i}$. In this example, the image restoration apparatus may set all of pixels of the i-th input image 420 to have the same disparity with respect to the target image 430, and may transform coordinates of all the pixels based on the same depth value (for example, a depth value corresponding to "d=1"). Similarly, the image restoration apparatus may assume that the i-th input image 420 has disparities d of "2", "3", "4", and "$d_{max}$" with respect to the target image 430, and may use a depth value corresponding to each of the disparities d of "2", "3", "4", and "$d_{max}$". For example, the image restoration apparatus may individually acquire 3D camera coordinate values transformed using a depth value $z_2$ corresponding to the disparity d of "2", 3D camera coordinate values transformed using a depth value $z_3$ corresponding to the disparity d of "3", 3D camera coordinate values transformed using a depth value $z_4$ corresponding to the disparity d of "4", and 3D camera coordinate values transformed using a depth value $z_{min}$ corresponding to the disparity d of "$d_{max}$". Although disparities having integer values are described above in FIG. 4, example embodiments are not limited thereto.

The image restoration apparatus may transform 3D camera coordinates of the i-th input image 420 converted using the disparity based on Equation 2 into 3D camera coordinates ($X_{c_T}$, $Y_{c_T}$, $Z_{c_T}$) for the target sensing unit 412 $C_T$ as shown in Equation 3 below.

$$\begin{bmatrix} X_{c_T} \\ Y_{c_T} \\ Z_{c_T} \end{bmatrix} = R_T \left( R_i^{-1} \left( \begin{bmatrix} X_{c_i} \\ Y_{c_i} \\ Z_{c_i} \end{bmatrix} - T_i \right) \right) + T_T =$$

$$R_T R_i^{-1} \begin{bmatrix} X_{c_i} \\ Y_{c_i} \\ Z_{c_i} \end{bmatrix} - R_T R_i^{-1} T_i + T_T$$

[Equation 3]

In Equation 3, $R_T$ denotes rotation information for a world coordinate system of the target sensing unit 412 $C_T$, and $T_T$ denotes translation information for the world coordinate system of the target sensing unit 412 $C_T$. Also, $R_i$ denotes rotation information for a world coordinate system of the i-th sensing unit 411 $C_i$, and $T_i$ denotes translation information for the world coordinate system of the i-th sensing unit 411 $C_i$. Rotation information and translation information may be calibration information, which will be described below with reference to FIG. 7. As shown in Equation 3, the image restoration apparatus may transform the 3D camera coordinates ($X_{c_T}$, $Y_{c_T}$, $Z_{c_T}$) based on the rotation information $R_i$ and $R_T$ and the translation information $T_i$ and $T_T$, to calculate 3D camera coordinates ($X_{c_T}$, $Y_{c_T}$, $Z_{c_T}$) that are based on the target sensing unit 412 $C_T$.

The image restoration apparatus may normalize the 3D camera coordinates ($X_{c_T}$, $Y_{c_T}$, $Z_{c_T}$) based on the target sensing unit 412 $C_T$ calculated from each pixel coordinate of an input image as shown in Equation 4 below.

$x_{c_T} = X_{c_T}/Z_{c_T}$ $y_{c_T} = Y_{c_T}/Z_{c_T}$ [Equation 4]

In Equation 4, the image restoration apparatus may acquire normalized coordinates ($x_{c_T}$, $y_{c_T}$) for the target sensing unit 412 $C_T$ by dividing each of $X_{c_T}$, $Y_{c_T}$ among the 3D camera coordinates that are based on the target sensing unit 412 $C_T$ by a depth $Z_{c_T}$.

The image restoration apparatus may calculate pixel coordinates ($u_{c_T}$, $v_{c_T}$) of the pixel coordinate system corresponding to the target image 430 from the normalized coordinates ($x_{c_T}$, $y_{c_T}$) for the target sensing unit 412 $C_T$ as shown in Equation 5 below.

$u_{c_T} = f_x^{(T)} \cdot x_{c_T} + c_x^{(T)}$ $v_{c_T} = f_y^{(T)} \cdot y_{c_T} + c_y^{(T)}$ [Equation 5]

In Equation 5, $c_x^{(T)}$, $c_y^{(T)}$ denote coordinates of principal points of the target sensing unit 412 $C_T$ with respect to an x-axis and a y-axis of the target sensing unit 412 $C_T$, respectively, and $f_x^{(T)}$, $f_y^{(T)}$ denote focal lengths in the x-axis and the y-axis of the target sensing unit 412 $C_T$, respectively. $c_x^{(T)}$, $c_y^{(T)}$ and $f_x^{(T)}$, $f_y^{(T)}$ will be further described below with reference to FIG. 7.

Based on Equations 1 through 5 described above, the image restoration apparatus may warp the i-th input image 420 to the pixel coordinate system corresponding to the target image 430 by transforming the pixel coordinates ($u_{c_i}$, $v_{c_i}$) of the i-th sensing unit 411 $C_i$ to pixel coordinates ($u_{c_T}$, $v_{c_T}$) of the target sensing unit 412 $C_T$. A series of operations based on Equations 1 through 5 may be referred to as a "warping operation". The warping operation has been described in time series for convenience of description, however, example embodiments are not limited thereto. An operation (for example, a unified matrix operation) including a combination of operations based on Equations 1 through 5 may also be used.

The image restoration apparatus may generate, for each of pieces of input information (for example, each of input images), a single warped image by warping all of pixels of a corresponding input image to the pixel coordinate system corresponding to the target image 430 based on a single depth corresponding to one of the plurality of disparities. For example, when a disparity d has a value of "j", all of pixels of a warped image generated from the i-th input image 420 based on a depth value $z_j$ corresponding to the disparity d of "j" may be pixels warped based on the same depth value $z_j$. In this example, j may be an integer greater than or equal to "1" and less than or equal to "$d_{max}$", but is not limited thereto, and may be a real number greater than or equal to "0" and less than or equal to "$d_{max}$". Also, the maximum disparity $d_{max}$ may be determined as shown in Equation 6 below.

$$d_{max} = \frac{bf}{z_{min}} \quad \text{[Equation 6]}$$

In Equation 6, b denotes a gap between two sensing units, f denotes a focal length of a sensing unit, and $z_{min}$ denotes a minimum capturing distance of the sensing unit. For example, a plurality of disparities may be less than or equal to the maximum disparity $d_{max}$ determined based on the minimum capturing distance $z_{min}$, the gap b and the focal length f, and may be greater than or equal to a minimum disparity $d_{min}$.

A depth corresponding to one of the plurality of disparities may be determined based on a disparity that is set for an input image with respect to the target image 430 and based on a gap b between sensing units $C_i$ and $C_T$ that respectively capture the input image and the target image 430. For example, when depths of all target points 490 appearing in an external scene are equal to $z_j$, all of pixels of the warped image corresponding to the one of the plurality of disparities may be accurately aligned with respect to the target image 430. However, since real subjects have various depths, a portion of pixels in an input image may be aligned with the target image 430.

For example, as shown in FIG. 4, the image restoration apparatus may generate a warped image corresponding to a plurality of disparities from the i-th input image 420. A plurality of warped images may include a first warped image 421 generated using the depth $z_1$ corresponding to the disparity d of "1", a second warped image 422 generated using the depth $z_2$ corresponding to the disparity d of "2", a third warped image 423 generated using the depth $z_3$ corresponding to the disparity d of "3", a fourth warped image 424 generated using the depth $z_4$ corresponding to the disparity d of "4", and a warped image 425 generated using the depth $z_{min}$ corresponding to the disparity d of "$d_{max}$". Although a portion of input images and a portion of warped images are illustrated in one dimension for convenience of description, example embodiments are not limited thereto. For example, each image may be a 2D image.

The target point 490 may be sensed at a target pixel 439 in the target image 430 and sensed at an input pixel 429 in the i-th input image 420. When the disparity d between the i-th input image 420 and the target image 430 is set to "1", the image restoration apparatus may generate the first warped image 421 by warping the i-th input image 420 such that a pixel in the i-th input image 420 spaced apart from the target pixel 439 by the disparity d of "1" is aligned to the target pixel 439 in the target image 430. The second warped image 422 may be generated by warping the i-th input image 420 such that a pixel in the i-th input image 420 spaced apart from the target pixel 439 by the disparity d of "2" is aligned to the target pixel 439. Similarly, each of the third warped image 423 through the warped image 425 may be generated by warping the i-th input image 420 such that a pixel in the input image 420 spaced apart from the target pixel 439 by a disparity d set for each of the third warped image 423 through the warped image 425 is aligned to the target pixel 439. As shown in FIG. 4, in the first warped image 421, the second warped image 422 and the warped image 425, the input pixel 429 may be aligned at a position different from the target pixel 439. In the third warped image 423 and the fourth warped image 424, the input pixel 429 may be aligned to the target pixel 439 by an error of one pixel or less. An alignment of pixels between a warped image and a target image is described below with reference to FIG. 5.

Figure 5:
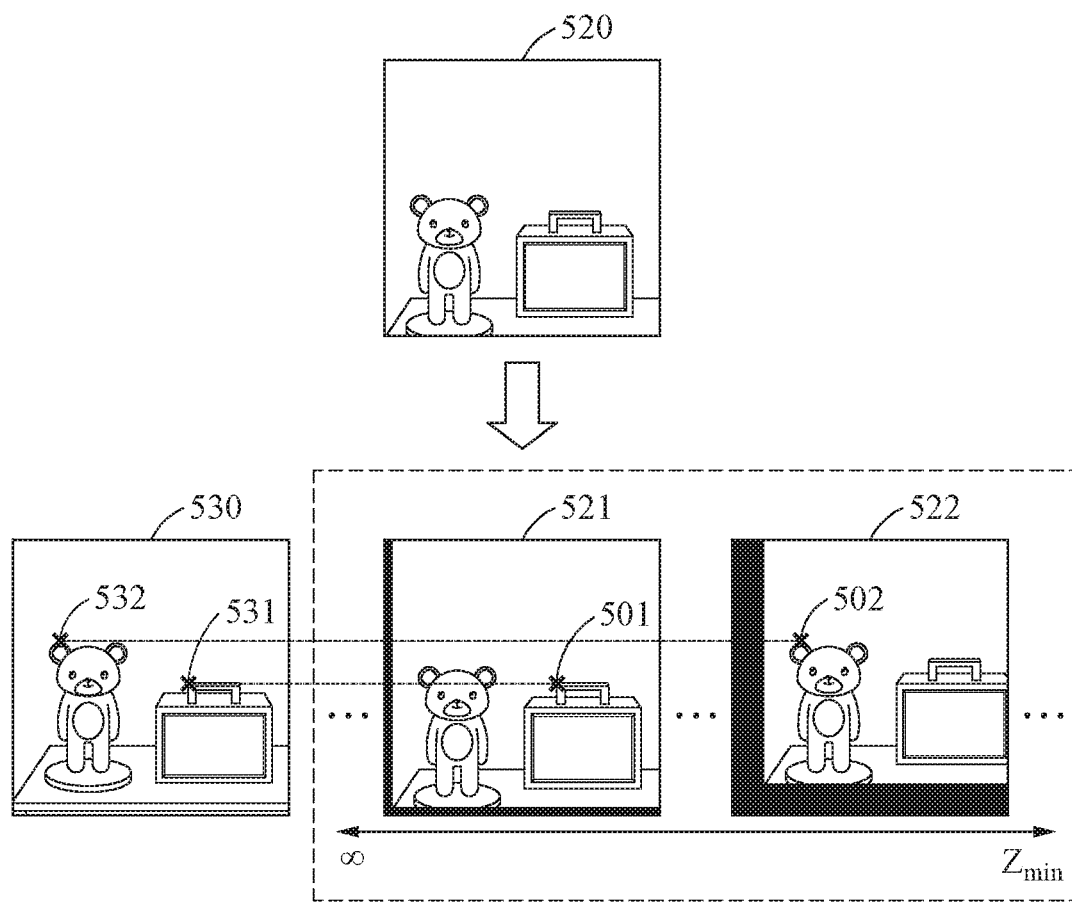
FIG. 5 is a diagram illustrating matching between pixels of warped images and pixels of a target image according to an example embodiment.

FIG. 5 is a diagram illustrating matching between pixels of warped images and pixels of a target image according to an example embodiment.

An error between at least one pixel among pixels included in each of a plurality of images warped from an input image 520 based on a plurality of disparities and a target pixel included in a target image 530 may be less than or equal to one pixel. As a result, although an accurate estimation of a depth of a target point is omitted, an image restoration apparatus may generate a plurality of warped images based on depths corresponding to preset disparities, to match at least one pixel included in at least one of the plurality of warped images to a target point. For example, in FIG. 5, a first pixel 501 of a first warped image 521 that is warped from the input image 520 may be matched to a pixel 531 of the target image 530. Also, a second pixel 502 of a second warped image 522 may be matched to a pixel 532 of the target image 530.

Although an example in which an arbitrary pixel in a warped image is matched to the target image 530 has been described with reference to FIG. 5 for convenience of description, example embodiments are not limited thereto. An arbitrary region in an input image may include the same optical information as that of a region of a target image corresponding to the arbitrary region, and a predetermined region of a portion of images warped from the input image may be matched to a region of the target image corresponding to the predetermined region.

Figure 6:
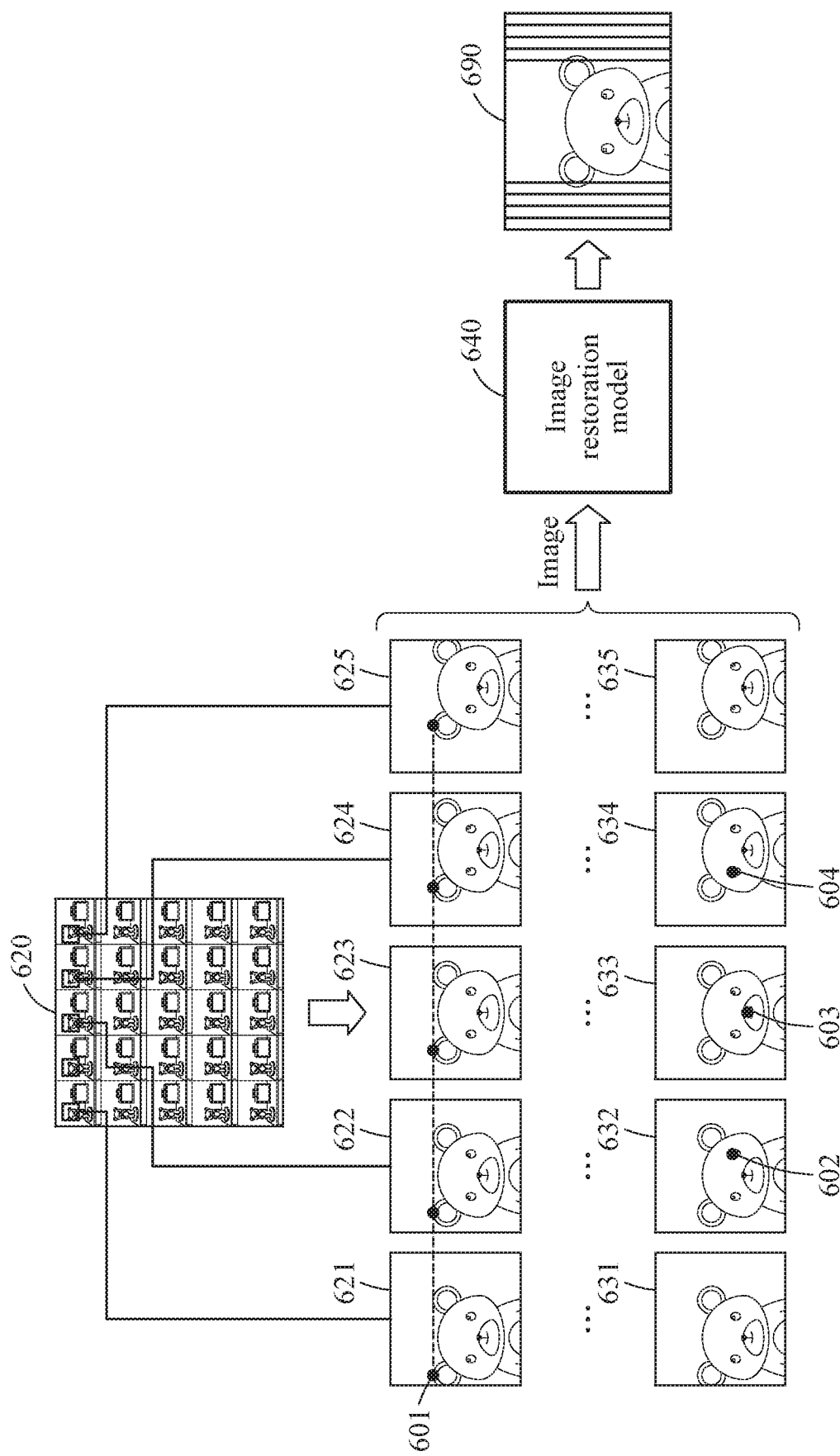
FIG. 6 is a diagram illustrating a generation of an output image through a registration of warped images according to an example embodiment.

FIG. 6 is a diagram illustrating a generation of an output image through a registration of warped images according to an example embodiment.

An image restoration apparatus may generate a first warped image 631, a second warped image 632, a third warped image 633, a fourth warped image 634, and a fifth warped image 635 from a plurality of input images 620. For example, the image restoration apparatus may generate the first warped image 631 from a first input image 621 based on a depth value corresponding to a given disparity. The second warped image 632 may be an image warped from a second input image 622, the third warped image 633 may be an image warped from a third input image 623, the fourth warped image 634 may be an image warped from a fourth input image 624, and the fifth warped image 635 may be an image warped from a fifth input image 625. In each of the first input image 621 through the fifth input image 625, a first pixel 601 may be matched to a target image. The target image may be selected from the plurality of input images 620, however, example embodiments are not limited thereto. A second pixel 602 in the second warped image 632, a third pixel 603 in the third warped image 633, and a fourth pixel 604 in the fourth warped image 634 may each be matched to the target image. The other warped images may also include pixels matched to the target image, but further description of the pixels is omitted herein for simplification of description.

The image restoration apparatus may provide the plurality of input images 620 and the first warped image 631 through the fifth warped image 635 to an image restoration model 640. The image restoration model 640 may include a CNN including a convolution layer as described above, and may be trained to output an output image 690 with a high resolution in response to an input of input image information and warped image information. For example, the image restoration apparatus may generate the output image 690 with a high resolution based on a registration of pixels matched to the target image in a variety of image information using the image restoration model 640.

Figure 7:
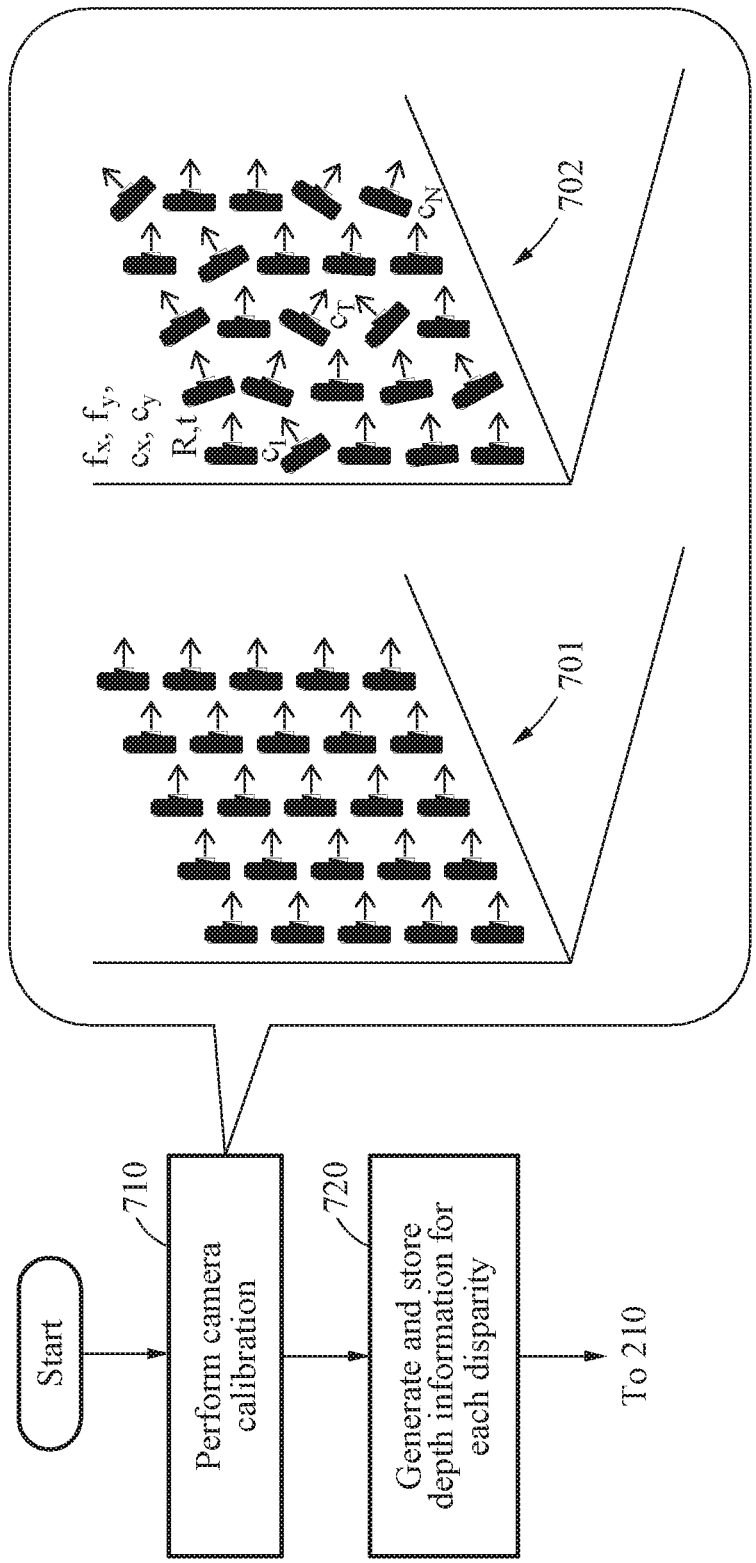
FIG. 7 is a diagram illustrating a camera calibration process according to an example embodiment.

FIG. 7 is a diagram illustrating a camera calibration process according to an example embodiment.

An image restoration apparatus may store in advance information used to generate warped image information.

For example, in operation 710, the image restoration apparatus may perform a camera calibration. A plurality of sensing units included in an image sensor may be designed to be in a state 701 in which all of the sensing units are aligned, however, sensing units of an actually manufactured image sensor may be in a state 702 in which the sensing units are misaligned. The image restoration apparatus may perform the camera calibration using a checker board. The image restoration apparatus may calculate principal points $c_x^{(i)}$, $c_y^{(i)}$ and focal lengths $f_x^{(i)}$, $f_y^{(i)}$ of a sensing unit respectively with respect to an x-axis and a y-axis of the sensing unit as internal camera parameters, through the camera calibration. Also, the image restoration apparatus may calculate rotation information $R_i$ and translation information $T_i$ for a world coordinate system of the sensing unit as external parameters, through the camera calibration.

In operation 720, the image restoration apparatus may generate and store depth information for each disparity. For example, the image restoration apparatus may calculate a depth value corresponding to a given disparity between input images sensed by two sensing units based on an arrangement relationship (for example, an angle formed between optical axes, or a gap between the sensing units) between the sensing units. As described above, a finite number of disparities may be provided within a limited range. For example, a disparity may be an integer disparity, however, example embodiments are not limited thereto.

The image restoration apparatus may calculate, in advance (e.g., prior to performing operation 210), a coordinate mapping function to be applied as a warping operation based on internal camera parameters and external parameters. The coordinate mapping function may refer to a function of transforming coordinates of each pixel in an input image to a pixel coordinate system corresponding to a target image, based on a depth corresponding to a given disparity, internal camera parameters and external parameters, and may include, for example, a function including a series of integrated operations according to Equations 1 through 5. The image restoration apparatus may calculate and store, in advance, coordinate mapping functions for each disparity and for each sensing unit.

To generate warped image information in operation 220 of FIG. 2, the image restoration apparatus may load the calculated coordinate mapping function for each of a target sensing unit and a sensing unit that captures one of a plurality of input images. The image restoration apparatus may generate warped image information by applying the coordinate mapping function that is calculated and stored in advance to the input image. Thus, it is possible to minimize a number of operations and to quickly generate warped image information provided to an image restoration model to generate an output image with a high resolution.

However, the coordinate mapping functions may not need to be calculated and stored in advance. The image restoration apparatus may store internal camera parameters and external parameters, instead of storing the pre-calculated coordinate mapping functions. The image restoration apparatus may load the stored internal camera parameters and the stored external parameters, may calculate a coordinate mapping function, and may generate warped image information for an input image using the calculated coordinate mapping function.

Figure 8:
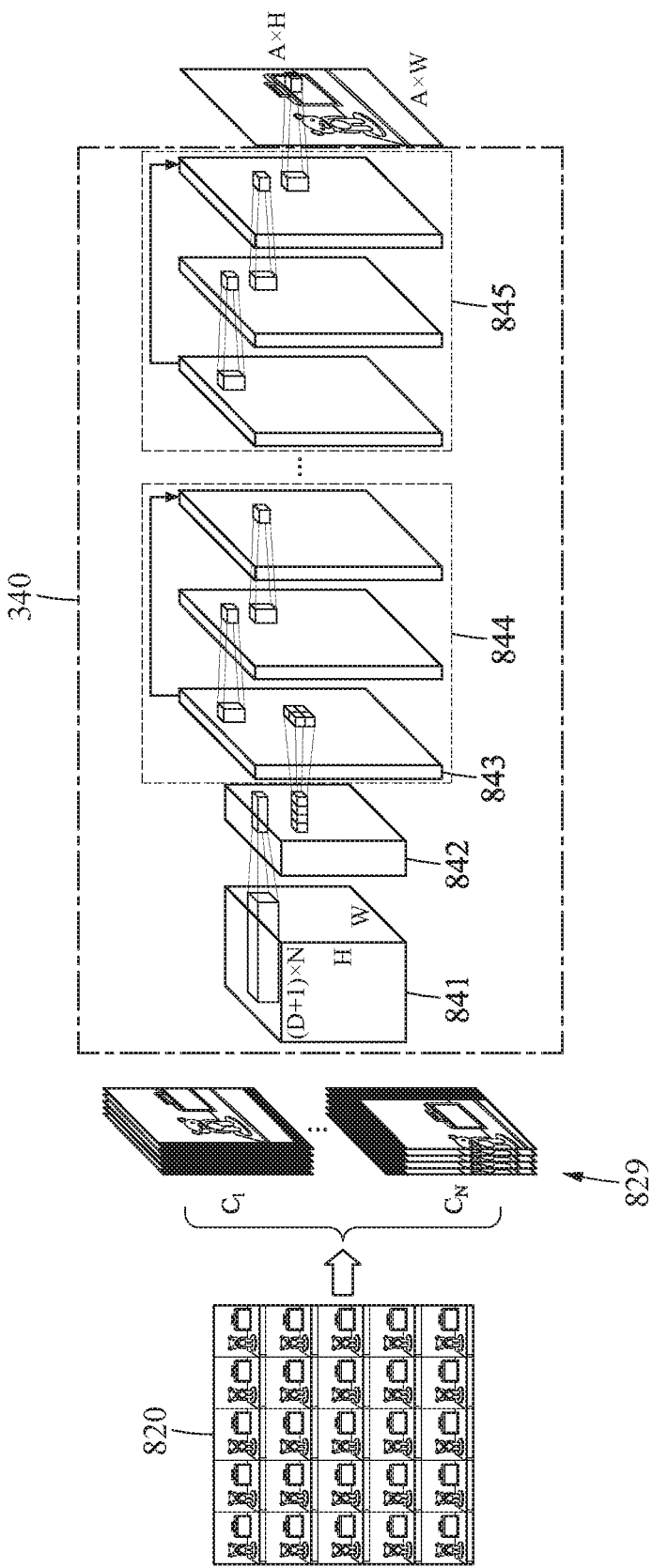
FIG. 8 is a diagram illustrating a structure of an image restoration model according to an example embodiment.

FIG. 8 is a diagram illustrating a structure of an image restoration model according to an example embodiment.

An image restoration apparatus may provide data obtained by concatenating a plurality of pieces of input information (for example, input images) and pieces of warped information (for example, warped images) as an input of an image restoration model, to generate an output image.

For example, the image restoration apparatus may generate concatenated data 841 by concatenating input image information 820 and a plurality of pieces of warped image information 829 that are generated from the input image information 820 as described above. For example, the image restoration apparatus may concatenate "N" input images acquired from "N" sensing units, and "D" warped images generated from the "N" input images. As shown in FIG. 8, the concatenated data 841 may include "(D+1)×N" images, because the input image information and the warped image information are concatenated. Each image may have a resolution of "H×W", and H and W represent a number of pixels corresponding to a height of each image and a number of pixels corresponding to a width of each image, respectively. A concatenating operation may be included in an operation of the image restoration model.

The image restoration apparatus may extract feature data from the concatenated data 841 through a convolution layer 842. The image restoration apparatus may perform a shuffle 843 such that pixel values indicating the same point in a plurality of pieces of feature data may be close to each other. The image restoration apparatus may generate an output image with a high resolution from the feature data through residual blocks 844 and 845. A residual block may refer to a block that outputs residual data between data that is input to the block and feature data that is extracted from the input data. The output image has a resolution of "(A×H)×(A×W)" that may be higher than "H×W" that is a resolution of each of a plurality of input images.

For example, referring to FIGS. 5 and 6, when a subject is located away from an image sensor within a distance between $[z_{min}, z_{max}]$, each region of a target image may include information similar to that of a region at the same position of at least one of "(D+1)×N" reconstructed images that are included in the above-described concatenated data 841. Thus, the image restoration apparatus may provide the concatenated data 841 to the image restoration model 340, and accordingly information of a region including information similar to that of the target image in each input image and warped image may be used, thereby enhancing a performance of an image restoration. Although depth information of a target point indicated by an individual pixel of an input image is not provided, the image restoration apparatus may generate an output image with a relatively high resolution. Also, the image restoration apparatus may restore an image if camera parameter information is known, even if input images are not aligned.

Although examples of direct warping of input images have been mainly described with reference to FIGS. 1 through 8, example embodiments are not limited thereto. An example of warping feature data extracted from an input image is described below with reference to FIG. 9.

Figure 9:
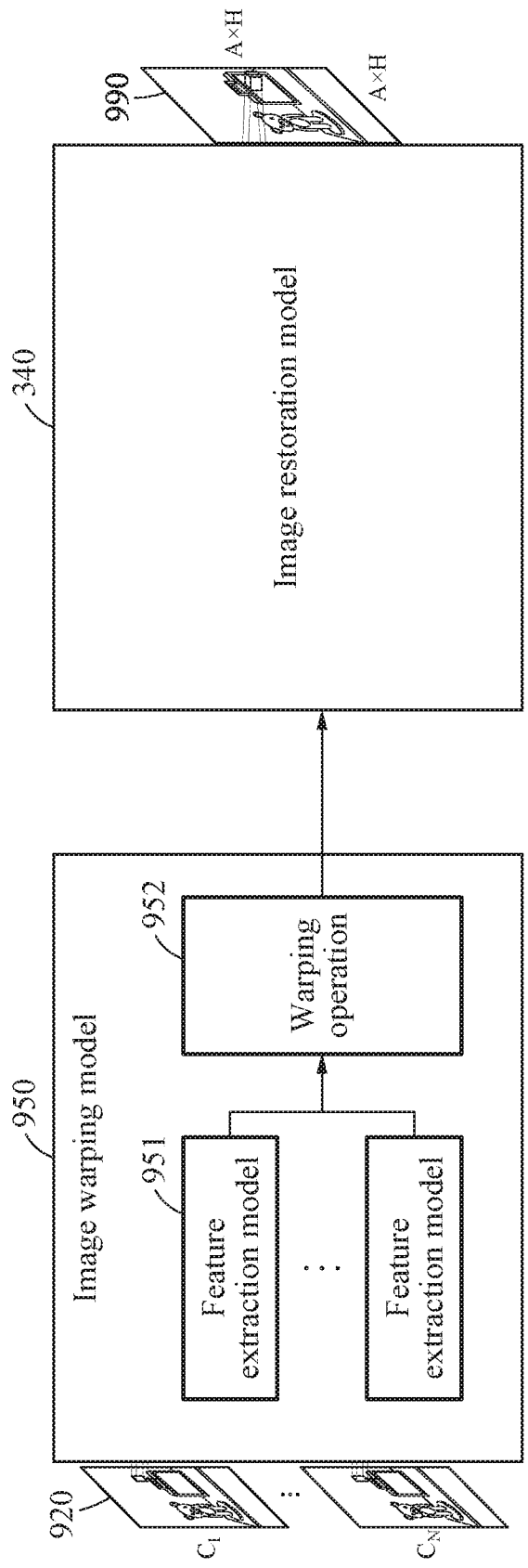
FIG. 9 is a diagram illustrating an image restoration process using an image warping model and an image restoration model according to an example embodiment.

FIG. 9 is a diagram illustrating an image restoration process using an image warping model and an image restoration model according to an example embodiment.

An image restoration apparatus may use an image warping model 950 together with an image restoration model 340. The image warping model 950 may include a feature extraction model 951 and a warping operation 952. The image warping model 950 may be a model trained to extract a feature map from each of input images 920 and to warp the extracted feature map. A parameter (for example, a connection weight) of the feature extraction model 951 may be changed by training, however, the warping operation 952 may include operations based on Equations 1 through 5 described above.

For example, the image restoration apparatus may extract a plurality of input feature maps as a plurality of pieces of input image information from a plurality of input images using the feature extraction model 951. The feature extraction model 951 may include at least one convolution layer, and an input feature map may be a result value obtained by performing a convolution filtering. The image restoration apparatus may warp each of the plurality of input feature maps to a pixel coordinate system corresponding to a target image based on a depth corresponding to each of a plurality of disparities, and generate a warped feature map as warped image information. A feature map obtained by warping an input feature map to a pixel coordinate system of a target sensing unit based on a depth corresponding to a predetermined disparity may be referred to as a "warped feature map". The warping operation 952 applied to an input feature map is the same as the warping operation 952 applied to the input image 920 based on Equations 1 through 5 described above, and thus further description thereof is not repeated herein.

For example, when an input image captured in a Bayer pattern is directly warped to a pixel coordinate system of a target sensing unit, the Bayer pattern may be lost in the warped image. Color information of each channel may be lost in a warped image while the color information is mixed by warping. The image restoration apparatus may extract an input feature map from an input image before color information is lost by the warping operation 952, and accordingly the color information is preserved in the input feature map. The image restoration apparatus may calculate a warped feature map by applying the warping operation 952 to the input feature map that is extracted in a state in which the color information is preserved. Thus, the image restoration apparatus may provide data, obtained by concatenating the plurality of input feature maps and warped feature maps, as an input of an image restoration model, and may generate an output image 990 with a high resolution and preserved color information. As described above, the image restoration apparatus may minimize a loss of color information.

Hereinafter, an example of a structure of the image warping model 950 is described with reference to FIG. 10.

Figure 10:
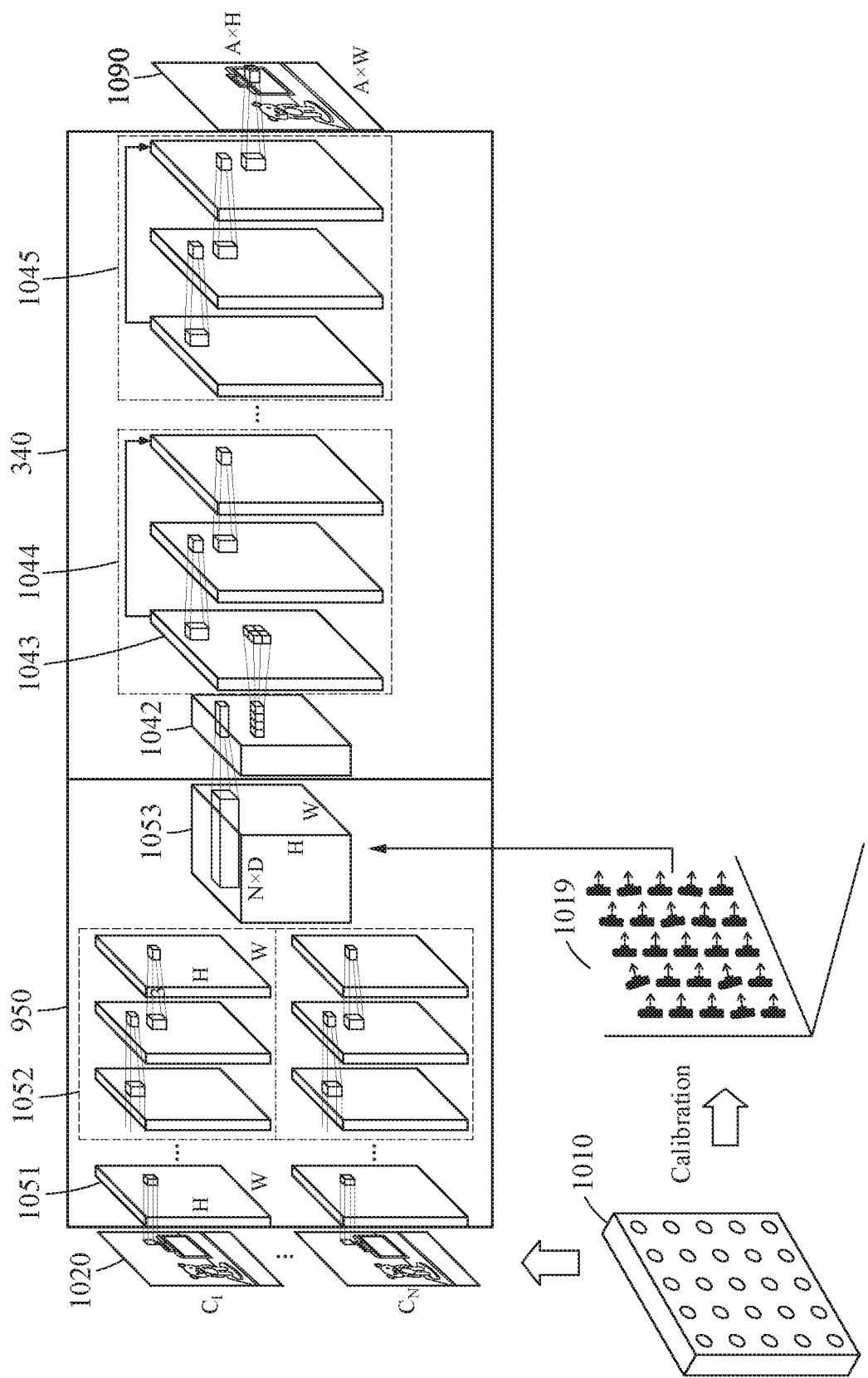
FIG. 10 is a diagram illustrating a structure of an image warping model according to an example embodiment.

FIG. 10 is a diagram illustrating a structure of an image warping model according to an example embodiment.

An image restoration apparatus may generate an input feature map and a warped feature map from a plurality of input images using an image warping model 950. For example, the image restoration apparatus may extract an input feature map from each of the plurality of input images using a feature extraction model. The feature extraction model may include at least one convolution layer 1051 as described above. Also, the feature extraction model may include a residual block 1052. For example, in FIG. 10, the feature extraction model may include one convolution layer and "M" residual blocks. In this example, "M" may be an integer greater than or equal to "1". The image restoration apparatus may extract an input feature map as a result value obtained by applying a convolution filtering to an individual input image 1020.

Also, the image restoration apparatus may apply a warping operation to the extracted input feature map. As described above, the image restoration apparatus may warp an input feature map corresponding to each sensing unit to a pixel coordinate system of a target sensing unit, based on a depth corresponding to each of a plurality of disparities and based on calibration information 1019 (for example, internal parameters and external parameters) of an image sensor 1010. For example, the image restoration apparatus may perform a warping operation of each input feature map based on depths corresponding to "D" disparities, to generate "D" warped feature maps with respect to one input feature map. The image restoration apparatus may generate concatenated data 1053 obtained by concatenating a plurality of input feature maps and warped feature maps. The concatenated data 1053 may include information associated with "N" input feature maps and "N×D" warped feature maps.

The image restoration apparatus may provide the concatenated data 1053 as an input of an image restoration model 340, to generate an output image 1090 with a high resolution (for example, a resolution increased by "A" times a resolution of an individual input image). For example, the image restoration model 340 may include one convolution layer 1042 and a plurality of residual blocks 1044 and 1045. The residual block 1044 among the plurality of residual blocks 1044 and 1045 may receive, as an input, the concatenated data 1053, and may receive data to which a shuffle 1043 is applied such that pixel values indicating the same point in the concatenated data 1053 are close to each other.

The above-described image warping model 950 and image restoration model 340 may be simultaneously or sequentially trained during training. Since a warping operation causing a loss of color information is included in the image warping model 950, the image warping model 950 may learn a parameter that minimizes a loss of colors during the training. The image warping model 950 and the image restoration model 340 may be trained through a backpropagation. For example, the image warping model 950 and the image restoration model 340 may be trained to output a training output with a high resolution (for example, a ground truth image with a high resolution) in response to an input of a training input with a low resolution (for example, a plurality of low resolution images). The image warping model 950 and the image restoration model 340 that are being trained may be referred to as a "temporary image warping model 950" and a "temporary image restoration model 340", respectively. The temporary image warping model 950 and the temporary image restoration model 340 may generate a temporary output from an arbitrary training input, and parameters (for example, a connection weight between nodes) of the temporary image warping model 950 and the temporary image restoration model 340 may be adjusted such that a loss between the temporary output and a ground truth image may be minimized.

Figure 11:
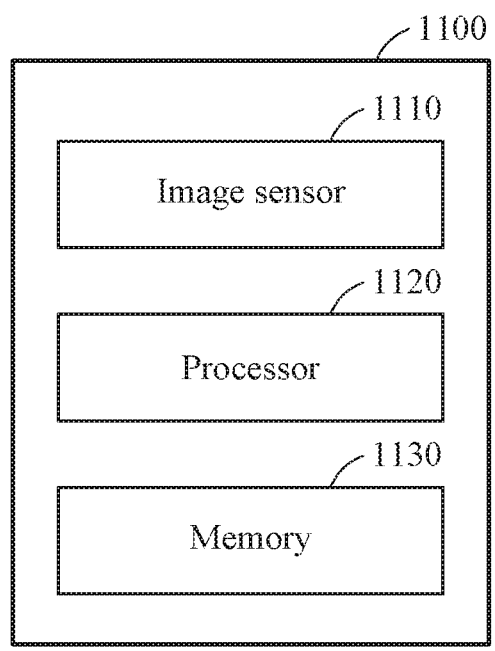
FIG. 11 is a block diagram illustrating a configuration of an image restoration apparatus according to an example embodiment.

FIG. 11 is a block diagram illustrating a configuration of an image restoration apparatus according to an example embodiment.

Referring to FIG. 11, an image restoration apparatus 1100 according to an example embodiment may include an image sensor 1110, a processor 1120 and a memory 1130.

The image sensor 1110 may acquire a plurality of pieces of input image information. The image sensor 1110 may acquire a plurality of input images captured using lenses located in different positions as a plurality of pieces of input image information. For example, the image sensor 1110 may include a sensing unit configured to acquire each of the plurality of pieces of input image information. To acquire "N" pieces of input image information, the image sensor 1110 may include "N" sensing units. For example, "N" sensing units may be included in a single image sensor (e.g., the image sensor 1110), example embodiments are not limited thereto. For example, "N" image sensors 1110 may be provided and each of "N" image sensors 1110 may include a sensing unit.

The processor 1120 may generate a plurality of pieces of warped image information corresponding to a plurality of disparities based on each of the plurality of pieces of input image information, and may generate an output image using an image restoration model based on the plurality of pieces of input image information and the plurality of pieces of warped image information. The processor 1120 may skip sensing of a depth to a target point corresponding to an individual pixel of an input image, and may generate the output image without the depth sensing operation.

However, an operation of the processor 1120 is not limited thereto, and the processor 1120 may simultaneously or sequentially perform at least one of the operations described above with reference to FIGS. 1 through 10.

The memory 1130 may temporarily or permanently store data used to perform an image restoration method according to an example embodiment. For example, the memory 1130 may store input image information, warped image information, and an output image. Also, the memory 1130 may store an image warping model, a parameter of the image warping model, an image restoration model and a parameter of the image restoration model. In an example embodiment, the parameters may be trained in advance.

Figure 12:
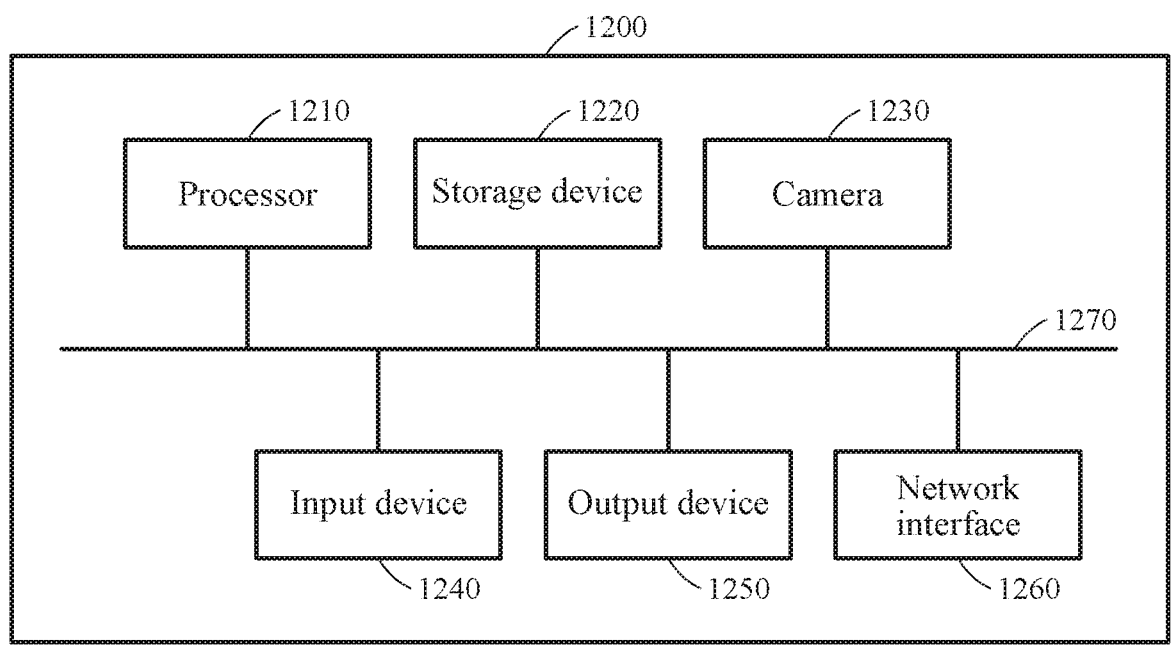
FIG. 12 is a block diagram illustrating a computing apparatus according to an example embodiment.

FIG. 12 is a block diagram illustrating a computing apparatus according to an example embodiment.

Referring to FIG. 12, a computing apparatus 1200 is an apparatus configured to generate a high resolution image using the above-described image restoration method. The computing apparatus 1200 may correspond to, for example, the image restoration apparatus 1100 of FIG. 11. The computing apparatus 1200 may include, for example, an image processing apparatus, a smartphone, a wearable device, a tablet computer, a netbook, a laptop computer, a desktop computer, a personal digital assistant (PDA), or a head-mounted display (HMD). In an example, the computing apparatus 1200 may also be implemented as a vision camera apparatus for vehicles, drones or closed-circuit televisions (CCTVs). In another example, the computing apparatus 1200 may be implemented as a webcam camera apparatus for video calls, a 360-degrees virtual reality (VR) camera apparatus, or a VR/augmented reality (AR) camera apparatus.

Referring to FIG. 12, the computing apparatus 1200 may include a processor 1210, a storage device 1220, a camera 1230, an input device 1240, an output device 1250 and a network interface 1260. The processor 1210, the storage device 1220, the camera 1230, the input device 1240, the output device 1250 and the network interface 1260 may communicate with one another through a communication bus 1270.

The processor 1210 may perform functions and execute instructions within the computing apparatus 1200. For example, the processor 1210 may process instructions stored in the storage device 1220. The processor 1210 may perform one or more operations described above with reference to FIGS. 1 through 11.

The storage device 1220 may store information or data used for execution of the processor 1210. The storage device 1220 may include a computer-readable storage medium or a computer-readable storage device. The storage device 1220 may store instructions to be executed by the processor 1210, and information associated with execution of software or an application while the software or the application is being executed by the computing apparatus 1200.

The camera 1230 may capture a plurality of input images. Also, although a still image has been mainly described as an image, example embodiments are not limited thereto. For example, the camera 1230 may capture images including one or more image frames. For example, the camera 1230 may generate a frame image corresponding to each of a plurality of lenses. In this example, the computing apparatus 1200 may generate a high resolution output image of each frame from a plurality of input images corresponding to individual frames using the above-described image warping model and image restoration model.

The input device 1240 may receive an input from a user including, for example but not limited to, a tactile input, a video input, an audio input, or and/a touch input. For example, the input device 1240 may detect an input from a keyboard, a mouse, a touchscreen, a microphone or the user, and may include other devices configured to transfer the detected input.

The output device 1250 may provide a user with an output of the computing apparatus 1200 through a visual channel, an audio channel, or a tactile channel. The output device 1250 may include, for example, a display, a touchscreen, a speaker, a vibration generator, or other devices configured to provide the user with the output. The network interface 1260 may communicate with an external device through a wired or wireless network. For example, the output device 1250 may provide the user with a result obtained by processing data based on at least one of visual information, auditory information and haptic information. The computing apparatus 1200 may visualize a generated output image having a high resolution on a display.

The example embodiments described herein may be implemented using hardware components, software components, or a combination thereof. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device may also access, store, manipulate, process, and generate data in response to execution of the software. For purpose of simplicity, the description of a processing device is used as singular; however, one skilled in the art should understand that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software may also be distributed over network coupled computer systems so that the software is stored and executed in a distributed fashion. The software and data may be stored by one or more non-transitory computer readable recording mediums.

The method according to the above-described example embodiments may be recorded in a non-transitory computer-readable medium including program instructions to implement various operations which may be performed by a computer. The medium may also include, alone or in combination with the program instructions, data files, data structures, and the like. The program instructions recorded on the medium may be those specially designed and constructed for the purposes of the example embodiments, or they may be of the well-known kind and available to those having skill in the computer software arts. Examples of non-transitory computer-readable medium include a magnetic medium such as a hard disk, a floppy disk, and a magnetic tape; an optical medium such as compact disc (CD) read-only memory (ROM) and a digital versatile disc (DVD); a magneto-optical medium such as an optical disc; and a hardware device that is specially configured to store and perform program instructions, such as a ROM, a random access memory (RAM), flash memory, and the like. Examples of program instructions include both machine code, such as code produced by a compiler, and files containing higher level code that may be executed by the computer using an interpreter. The described hardware devices may be configured to act as one or more software modules in order to perform the operations of the above-described example embodiments, or vice versa.

While a few example embodiments are described, it will be apparent to one of ordinary skill in the art that various changes in form and details may be made to the example embodiments without departing from the spirit and scope of the claims and their equivalents. The example embodiments described herein are to be considered in a descriptive sense only, and not for purposes of limitation. Descriptions of features or aspects in each example embodiment are to be considered as being applicable to similar features or aspects in other example embodiments. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An image restoration method comprising:
acquiring a plurality of pieces of input image information of a plurality of input images;
generating, with respect to each of a plurality of disparities, a plurality of pieces of warped image information based on the plurality of pieces of input image information; and
generating an output image based on the plurality of pieces of input image information and the plurality of pieces of warped image information, by using an image restoration model,
wherein the plurality of disparities are preset, and the plurality of pieces of warped image information are generated by using distances of the plurality of input images to a target point determined based on the plurality of preset disparities.

2. The image restoration method of claim 1, wherein the plurality of input images of the plurality of pieces of input image information are captured by using lenses located in different positions.

3. The image restoration method of claim 2, wherein the generating the plurality of pieces of warped image information comprises generating, with respect to each of the plurality of disparities, a plurality of warped images, as the plurality of pieces of warped image information, by warping each of the plurality of input images to a pixel coordinate system corresponding to a target image based on a depth corresponding to each of the plurality of disparities.

4. The image restoration method of claim 3, wherein the generating the plurality of warped images comprises generating a warped image by warping all of pixels in a first input image, among the plurality of input images, to the pixel coordinate system corresponding to the target image based on a single depth corresponding to a first disparity among the plurality of disparities.

5. The image restoration method of claim 3, wherein a disparity is set for an input image with respect to the target image, and the depth corresponding to the disparity is based on the disparity and a gap between sensing units that capture the target image and the input image.

6. The image restoration method of claim 3, wherein the generating the output image comprises generating the output image by providing, as an input to the image restoration model, data obtained by concatenating the plurality of input images and the plurality of warped images corresponding to each of the plurality of disparities.

7. The image restoration method of claim 1, wherein the plurality of pieces of input image information comprises a plurality of input feature maps extracted from the plurality of input images by using a feature extraction model.

8. The image restoration method of claim 7, wherein the generating the plurality of pieces of warped image information comprises generating, with respect to each of the plurality of disparities, a plurality of warped feature maps, as the plurality of pieces of warped image information, by warping each of the plurality of input feature maps to a pixel coordinate system corresponding to a target image based on a depth corresponding to each of the plurality of disparities.

9. The image restoration method of claim 8, wherein the generating the output image comprises generating the output image by providing, as an input to the image restoration model, data obtained by concatenating the plurality of input feature maps and the plurality of warped feature maps corresponding to each of the plurality of disparities.

10. The image restoration method of claim 1, wherein the image restoration model is a neural network comprising at least one convolution layer configured to apply a convolution filtering to input data.

11. The image restoration method of claim 1, wherein the plurality of disparities are less than or equal to a maximum disparity and greater than or equal to a minimum disparity, and wherein the maximum disparity is based on a minimum capturing distance of sensing units, the sensing units being configured to capture input images corresponding to the plurality of pieces of input image information, a gap between the sensing units, and focal lengths of the sensing units.

12. The image restoration method of claim 11, wherein the plurality of disparities are a finite number of disparities.

13. The image restoration method of claim 1, wherein the generating the output image comprises generating the output image without sensing a depth to the target point corresponding to an individual pixel of an input image.

14. The image restoration method of claim 1, wherein the generating the plurality of pieces of warped image information comprises:
   generating a piece of warped image information by applying a coordinate mapping function to an input image corresponding to a piece of input image information, the coordinate mapping function being determined in advance with respect to a target sensing unit configured to capture a target image and a sensing unit configured to capture the input image.

15. The image restoration method of claim 1, wherein a resolution of the output image is higher than a resolution of each of the plurality of pieces of input image information.

16. The image restoration method of claim 1, wherein the plurality of pieces of input image information comprise a multi-lens image captured by an image sensor including a multi-lens array, the multi-lens image including the plurality of input images.

17. The image restoration method of claim 1, wherein the plurality of input images of the plurality of pieces of input image information are respectively captured by a plurality of image sensors.

18. A non-transitory computer-readable storage medium storing instructions that, when executed by at least one processor, cause the at least one processor to perform the method of claim 1.

19. An image restoration apparatus comprising:
   an image sensor configured to acquire a plurality of pieces of input image information of a plurality of input images; and
   a processor configured to:
      generate, with respect to each of a plurality of disparities, a plurality of pieces of warped image information based on each of the plurality of pieces of input image information, and
      generate an output image based on the plurality of pieces of input image information and the plurality of pieces of warped image information, by using an image restoration model,
   wherein the plurality of disparities are preset, and the processor is configured to generate the plurality of pieces of warped image information by using distances of the plurality of input images to a target point determined based on the plurality of preset disparities.

20. An image restoration apparatus comprising:
   a lens array comprising a plurality of lenses;
   a sensing array comprising a plurality of sensing elements configured to sense light passing through the lens array, the sensing array comprising a plurality of sensing regions respectively corresponding to the plurality of lenses and configured to acquire a plurality of pieces of input information of a plurality of input images; and
   a processor configured to:
      generate, with respect to each of a plurality of disparities, a plurality of pieces of warped information based on each of the plurality of pieces of input information, and
      generate an output image based on the plurality of pieces of input information and the plurality of pieces of warped information, by using an image restoration model,
   wherein the plurality of disparities are preset, and the processor is configured to generate the plurality of pieces of warped information by using distances of the plurality of input images to a target point determined based on the plurality of preset disparities.

21. The image restoration apparatus of claim 20, wherein a resolution of the output image is higher than a resolution corresponding to each of the plurality of pieces of input information.

22. The image restoration apparatus of claim 20, wherein the processor is further configured to generate, with respect to each of the plurality of disparities, the plurality of pieces of warped information by warping each of the plurality of pieces of input information to a pixel coordinate system corresponding to a target image based on a depth corresponding to each of the plurality of disparities.

23. The image restoration apparatus of claim 22, wherein the processor is further configured to generate a piece of warped information by warping all of pixels corresponding to a piece of input information, among the plurality of pieces of input information, to the pixel coordinate system corresponding to the target image based on a single depth corresponding to a first disparity among the plurality of disparities.

24. The image restoration apparatus of claim 22, wherein the processor is further configured to generate the output image by providing, as an input to the image restoration model, data obtained by concatenating the plurality of pieces of input information and the plurality of pieces of warped information corresponding to each of the plurality of disparities.

25. The image restoration apparatus of claim 20, wherein the processor is further configured to extract, as the plurality of pieces of input information, a plurality of input feature maps from the plurality of input images, by using a feature extraction model.

26. The image restoration apparatus of claim 25, wherein the processor is further configured to generate, with respect to each of the plurality of disparities, a plurality of warped feature maps, as the plurality of pieces of warped information, by warping each of the plurality of input feature maps to a pixel coordinate system corresponding to a target image based on a depth corresponding to each of the plurality of disparities.

27. The image restoration apparatus of claim 26, wherein the processor is further configured to generate the output image by providing, as an input to the image restoration model, data obtained by concatenating the plurality of input feature maps and the plurality of warped feature maps corresponding to each of the plurality of disparities.

* * * * *